US008298090B2

(12) United States Patent
Kazama et al.

(10) Patent No.: US 8,298,090 B2
(45) Date of Patent: Oct. 30, 2012

(54) ATTACHMENT FOR GAME CONTROLLER AND CONTROLLER ASSEMBLY

(75) Inventors: Kouichi Kazama, Saitama (JP); Ryo Fukikoshi, Saitama (JP); Sayuri Goto, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/157,538

(22) Filed: Jun. 10, 2011

(65) Prior Publication Data
US 2011/0306424 A1 Dec. 15, 2011

(30) Foreign Application Priority Data

Jun. 14, 2010 (JP) ................................ 2010-135567

(51) Int. Cl.
*A63F 9/24* (2006.01)
*A63F 13/00* (2006.01)
(52) U.S. Cl. ............................... 463/47; 463/37; 463/46
(58) Field of Classification Search .................. 463/1, 7, 463/36–39, 47, 48, 46; 345/156
See application file for complete search history.

(56) References Cited

U.S. PATENT DOCUMENTS

| 6,231,444 B1 | | 5/2001 | Goto | |
|---|---|---|---|---|
| D599,352 S | * | 9/2009 | Takamoto et al. | ........... D14/400 |
| D614,624 S | * | 4/2010 | Zhang | ........................ D14/418 |
| 8,057,309 B1 | * | 11/2011 | Mead et al. | ...................... 463/48 |
| 2007/0060391 A1 | * | 3/2007 | Ikeda et al. | ...................... 463/46 |
| 2007/0117625 A1 | * | 5/2007 | Marks et al. | ...................... 463/30 |
| 2008/0015017 A1 | * | 1/2008 | Ashida et al. | ................... 463/37 |
| 2008/0261693 A1 | * | 10/2008 | Zalewski | ........................ 463/31 |
| 2009/0082108 A1 | * | 3/2009 | Ye | .................................. 463/39 |
| 2009/0298590 A1 | * | 12/2009 | Marks et al. | ................... 463/37 |
| 2010/0178981 A1 | * | 7/2010 | Holcomb et al. | ............... 463/37 |
| 2010/0279771 A1 | * | 11/2010 | Block et al. | ...................... 463/37 |
| 2011/0195785 A1 | | 8/2011 | Ashida | |

FOREIGN PATENT DOCUMENTS

| JP | 2007083024 A | 4/2007 |
|---|---|---|
| JP | 2007300980 A | 11/2007 |
| JP | 2010123088 A | 6/2010 |
| WO | 2010051089 A | 5/2010 |
| WO | 2010062521 A | 6/2010 |

OTHER PUBLICATIONS

"Playstation Move" From Wikipedia, The Free Encyclopedia. Online. [retrieved on Apr. 24, 2011]. <URL: http://en.wikipedia.org/wiki/Playstation_Move>. 15 Pages.*
Office Action for corresponding JP Application No. 2010-135567, dated May 22, 2012.

* cited by examiner

*Primary Examiner* — Milap Shah
(74) *Attorney, Agent, or Firm* — Matthew B. Dernier, Esq.; Gibson & Dernier LLP

(57) ABSTRACT

An attachment includes an attached portion that is attachable to, and detachable from, the outer circumferential surface of a game controller and a grip to be held by a user. The attached portion is formed such that the front end thereof is positioned further rearward than the light emitting part when the attached portion is attached to the game controller. According to the attachment, it is possible to prevent deterioration in recognition of the light emitting part by the image capturing unit.

12 Claims, 9 Drawing Sheets

ATTACHMENT FOR GAME CONTROLLER AND CONTROLLER ASSEMBLY

BACKGROUND OF THE INVENTION

1. Field of the Invention

The present invention relates to an attachment for a game controller and a controller assembly comprising the attachment and the game controller.

2. Description of the Related Art

There have been available game controllers operated by a user while being held with his/her hand when the user plays a television game and so forth (e.g., U.S. Pat. No. 6,231,444). Some of the conventional controllers are formed in a gun shape or a steering shape. Use of a controller shaped as such can increase the realism of the game. Moreover, in recent years, bar-shaped game controllers designed to be operated while being held by a user with his/her single have been used.

SUMMARY OF THE INVENTION

As a game system that utilizes a bar-shaped controller, there has been developed a game system which includes a controller having a light emitting part at the front end thereof and an image capturing unit (a camera) for continuously capturing the light from the light emitting part and recognizes the position of the light emitting part through the image capturing unit. In this type of game system, a user can play a game not only by operating a button but also by moving the controller itself.

If an attachment is attached to a bar-shaped controller or the like so that the controller can be used as a gun-shaped controller or the like, the realism of the game can be enhanced and the number of situations where a bar-shaped controller is used can be increased. However, an attachment attached to a controller may possibly hinder appropriate capturing of light from the light emitting part by the image capturing unit when the controller is in some orientation.

According to one aspect of the present invention, there is provided an attachment for a bar-shaped game controller having a light emitting part arranged at a front end thereof, the attachment including a grip for being held by a user; and an attached portion attachable to, and detachable from, an outer circumferential surface of the game controller. The attached portion is formed such that a front end thereof is positioned more rearward than the light emitting part when the attached portion is attached to the game controller.

According to another aspect of the present invention, there is provided a controller assembly, comprising a bar-shaped game controller including a light emitting part at a front end thereof; and an attachment for the game controller. The attachment includes a grip for being held by a user, and an attached portion attachable to, and detachable from, an outer circumferential surface of the game controller. The attached portion is formed such that a front end thereof is positioned more rearward than the light emitting part when the attached portion is attached to the game controller.

According to the present invention, it is possible to prevent deterioration in recognition of the light emitting part by the image capturing unit.

DETAILED DESCRIPTION OF THE INVENTION

Figure 1:
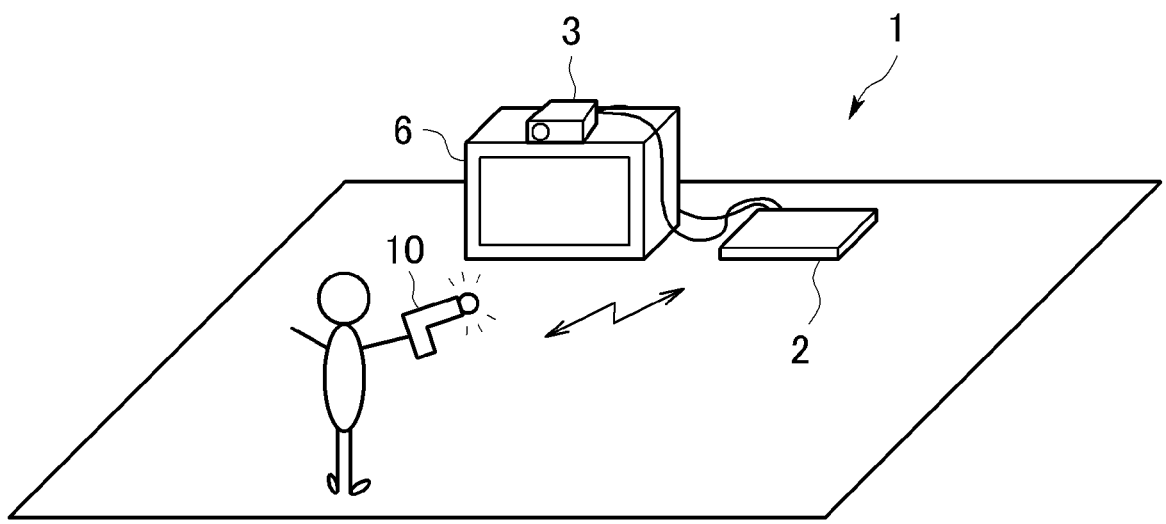
FIG. 1 is a schematic diagram showing a game system including a controller assembly according to an embodiment of the present invention.
Figure 2:
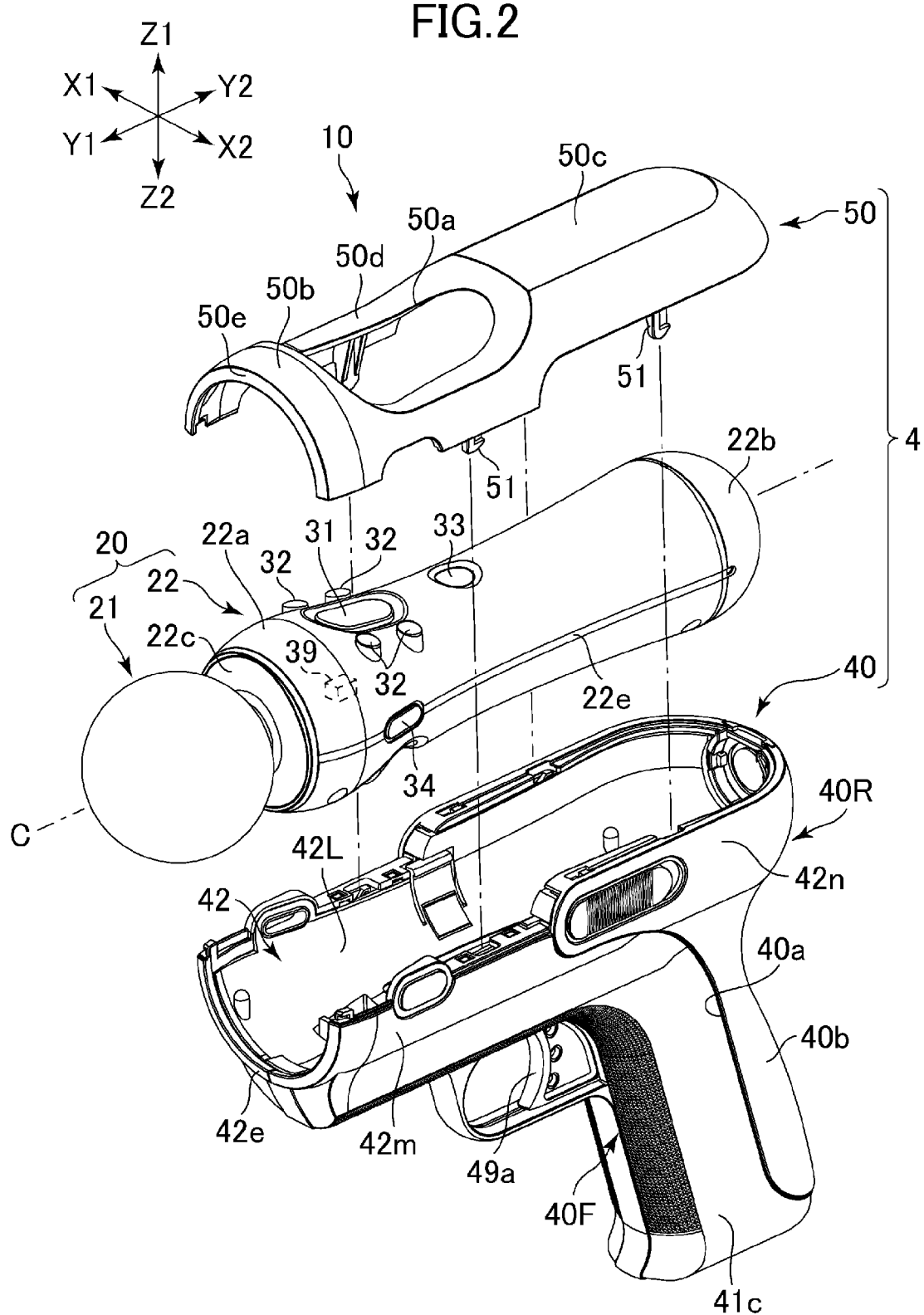
FIG. 2 is an exploded perspective view of the above described controller assembly.

In the following, one embodiment of the present invention will be described with reference to the accompanying drawings. FIG. 1 is a schematic diagram of a game system 1 including a controller assembly 10 that is an example of an embodiment of the present invention. FIG. 2 is an exploded perspective view of the controller assembly 10. Hereafter, a gun-shaped controller assembly will be described below as the controller assembly 10.

As shown in FIG. 1, the game system 1 comprises, in addition to the controller assembly 10, a game device 2, and an image capturing unit (camera) 3.

The game device 2 is, e.g., a consumer game device to be mainly used for a game or a personal computer. The game device 2 is connected to a display device 6 so that a game image produced by the game device 2 is shown on the display device 6.

The controller assembly 10 is an operating device designed to be operated by a user while being held with his/her hand for inputting an operation to the game device 2. Specifically, the controller assembly 10 sends a signal in accordance with a user operation to the game device 2. In this example, the controller assembly 10 includes a game controller 20 incorporating a radio communication interface (see FIG. 2). The game controller 20 sends a signal in accordance with a user operation to the game device 2 through the radio communication interface. The game controller 20 further includes a sensor 39 employing an accelerator sensor or the like (see FIG. 2), as to be described later, and sends information output from the sensor 39 to the game device 2 through the radio communication interface. The game controller 20 still further includes a light emitting part 21. The image capturing unit 3 continuously captures the light from the light emitting part 21, and sends motion image information to the game device 2. The game device 2 specifies the position and posture of the controller assembly 10, based on the information output from the sensor 39 and the motion image information from the image capturing unit 3. This configuration allows a user to input an operation to the game device 2 not only by operating a button but also by moving the controller assembly 10 itself.

In the following, the controller assembly 10 will be described in detail. As shown in FIG. 2, the controller assembly 10 comprises the game controller 20 and the attachment 4. The attachment 4 in this example includes an attachment main body 40 and a cover 50 attached to the attachment main body 40.

Figure 3:
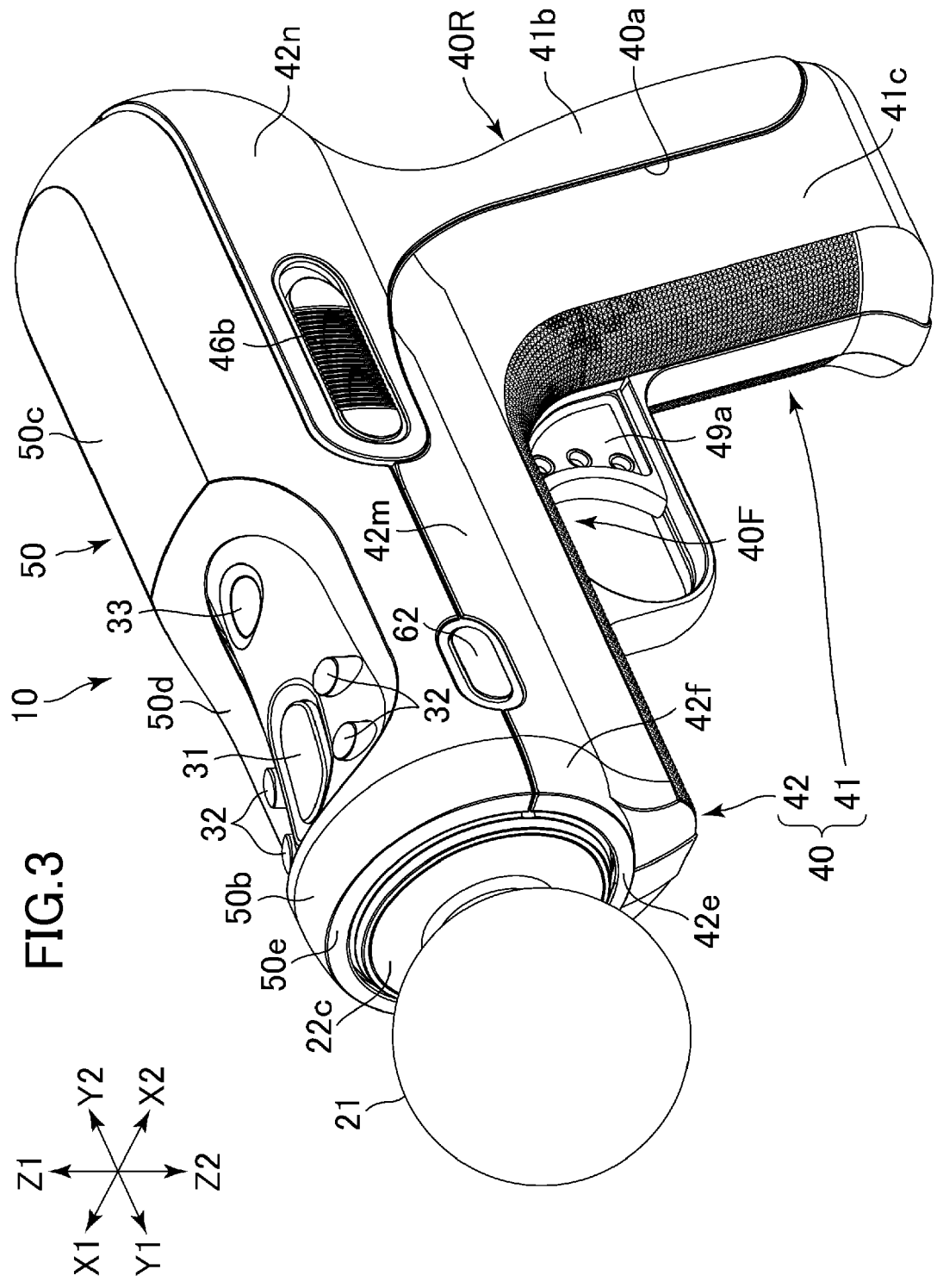
FIG. 3 is a perspective view of the above described controller assembly.
Figure 4:
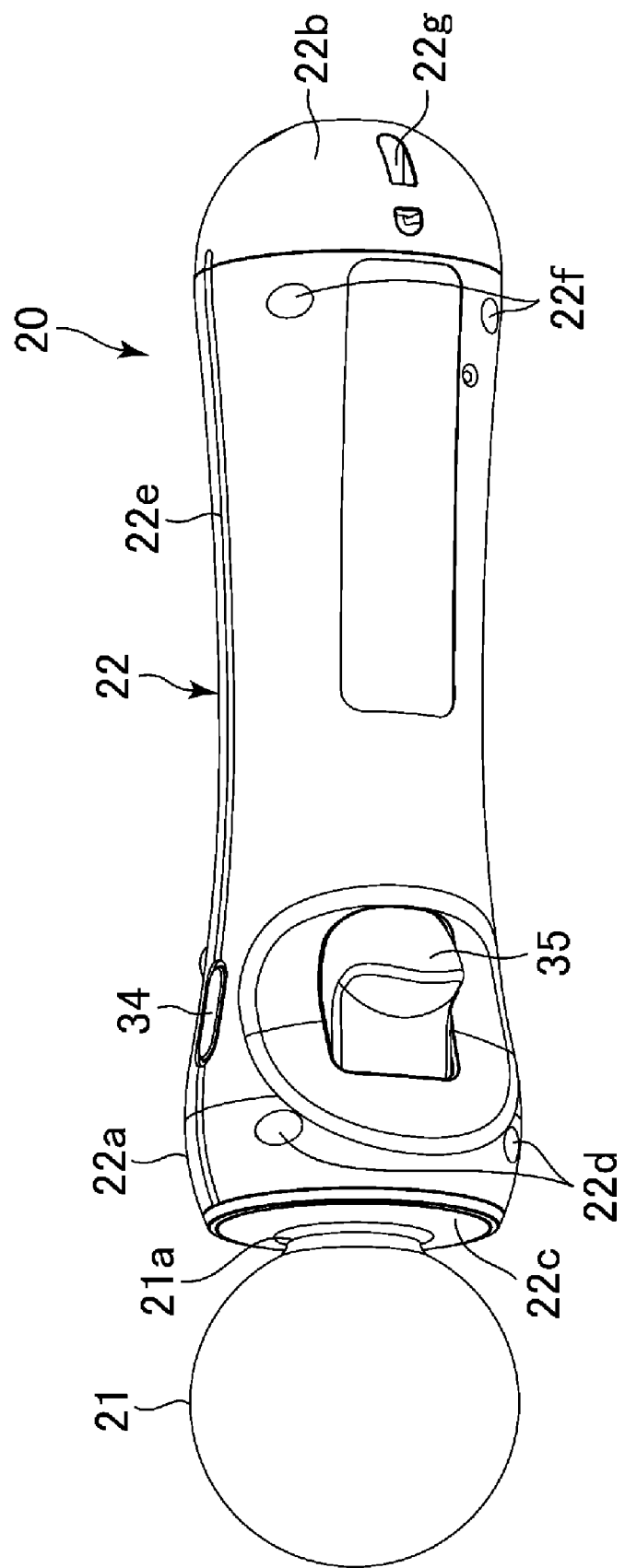
FIG. 4 is a perspective view of a game controller that is a component of the above described controller assembly.
Figure 5:
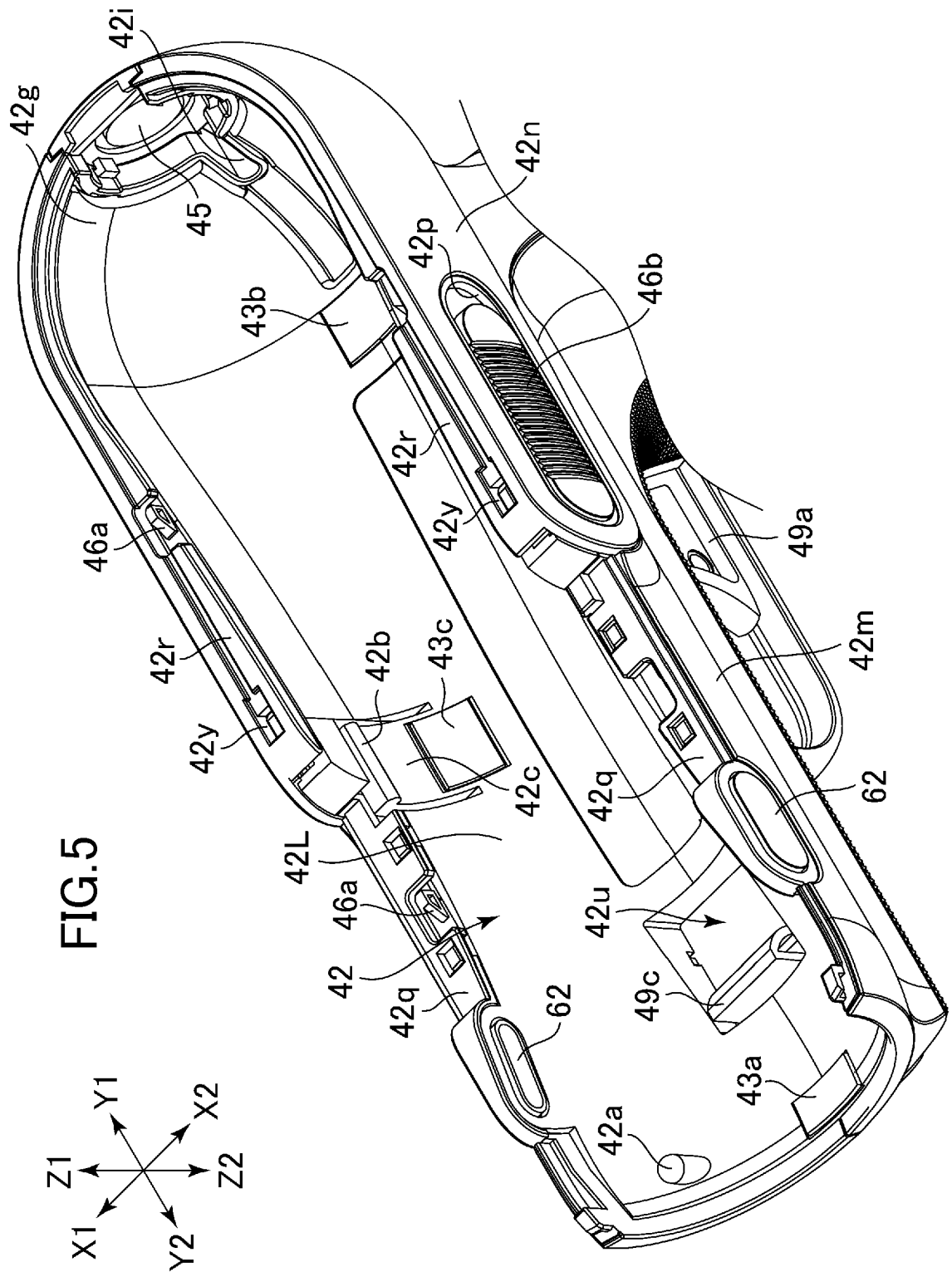
FIG. 5 is a perspective view of an attachment main body that is a component of the above described controller assembly.
Figure 6:
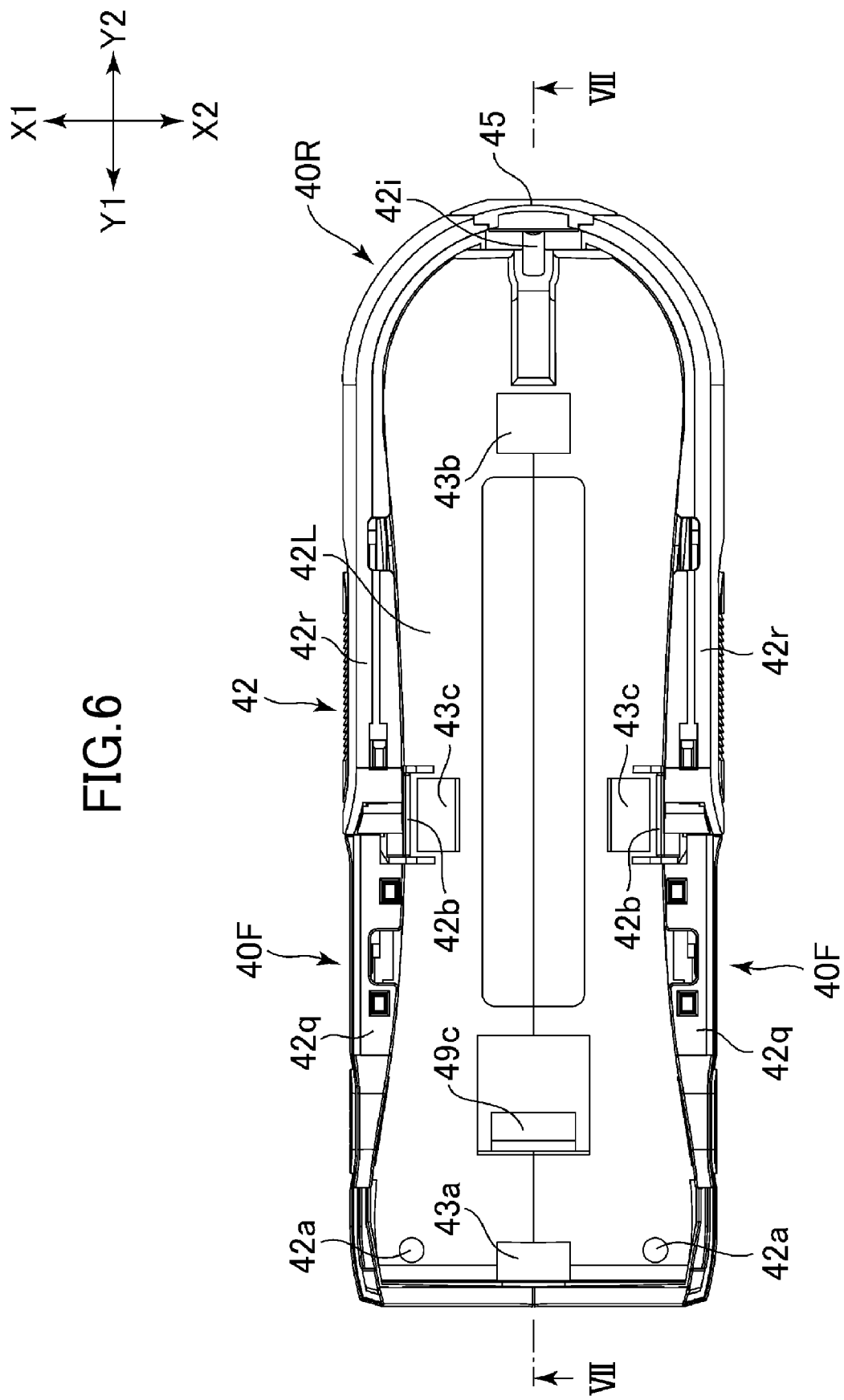
FIG. 6 is a plan view of the above described attachment main body.
Figure 7:
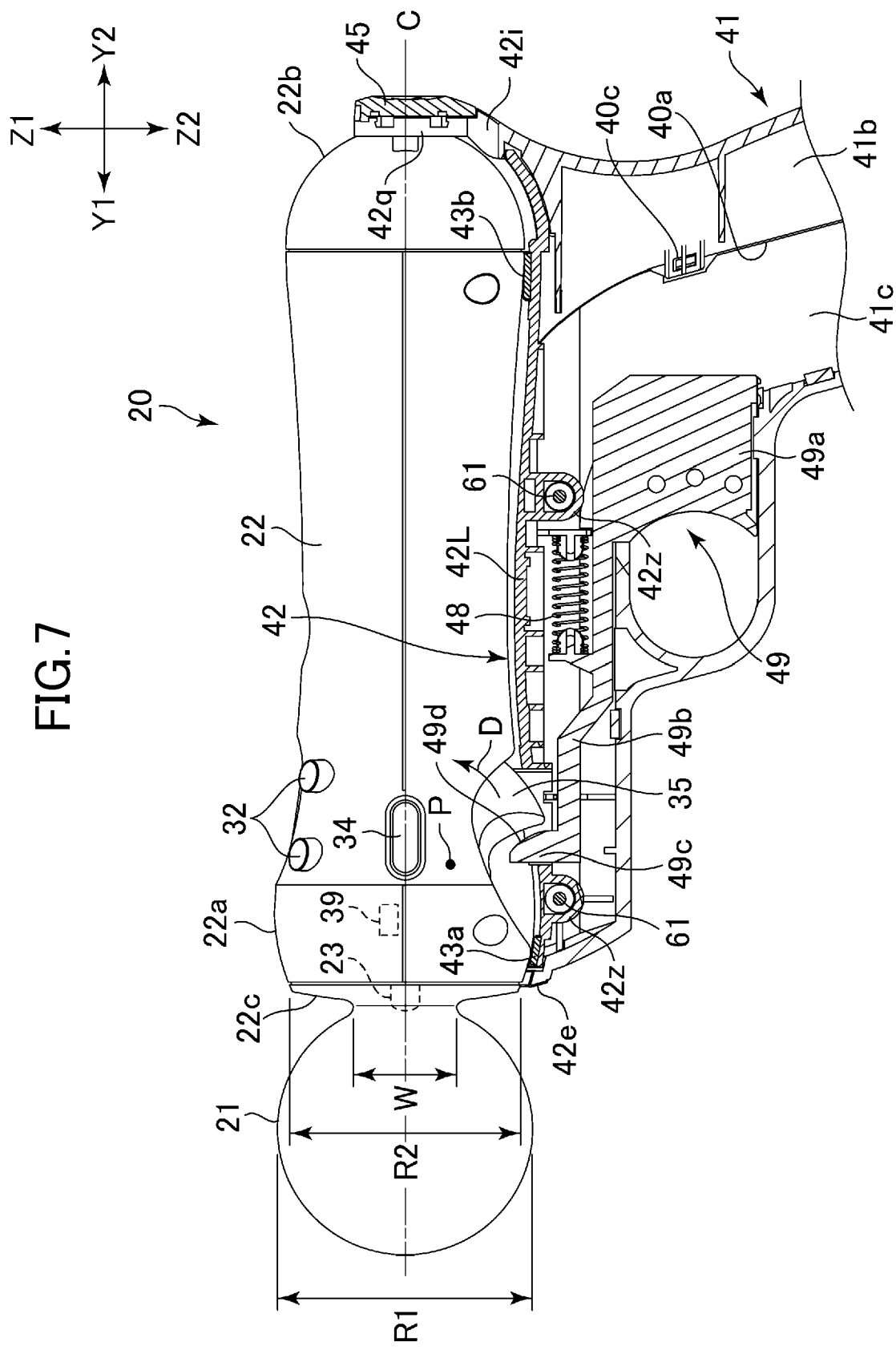
FIG. 7 is a cross sectional view along the line VII-VII shown in FIG. 6, showing the attachment main body attached to the game controller.
Figure 8:
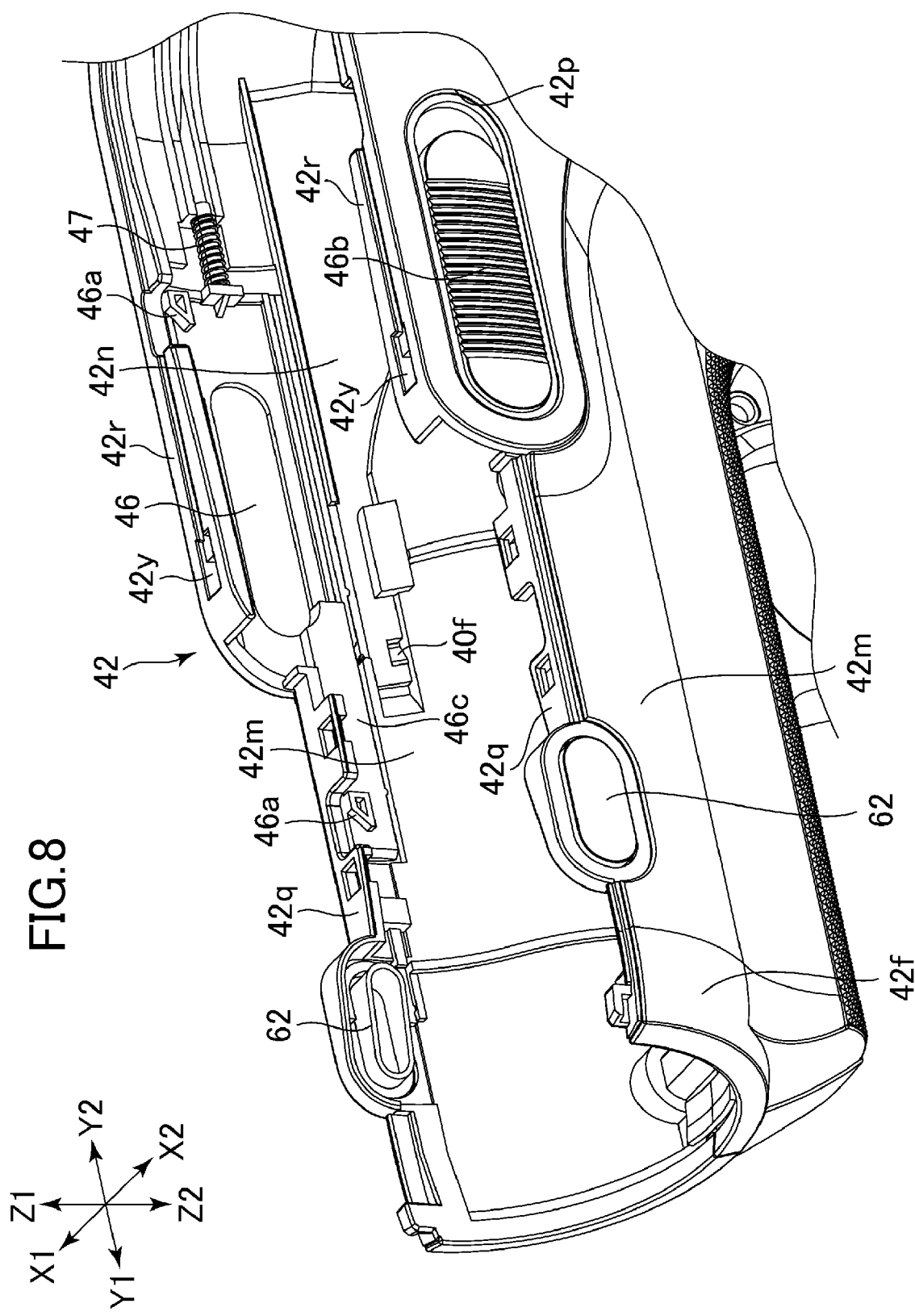
FIG. 8 is a perspective view of the above described attachment main body, showing a structure for fixedly attaching a cover, which is a component of the attachment, to the attachment main body.
Figure 9:
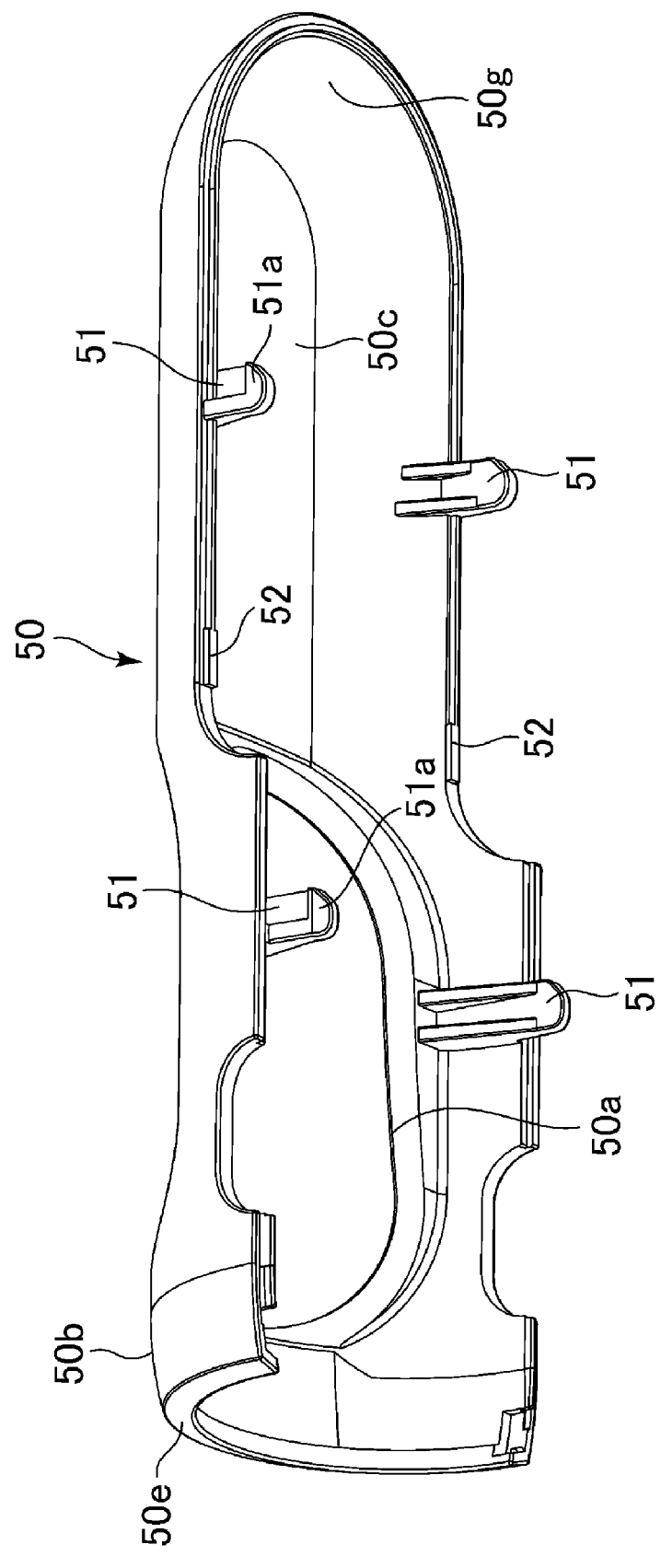
FIG. 9 is a perspective view of the above mentioned cover.

FIG. 3 is a perspective view of the controller assembly 10. FIG. 4 is a perspective view of the game controller 20. FIG. 5 is a perspective view of the attachment main body 40. FIG. 6 is a plan view of the attachment main body 40. FIG. 7 is a cross sectional view along the line VII-VII shown in FIG. 6. FIG. 8 is a perspective view of the attachment main body 40, and in this figure, an inside wall 42L to be described later removed from the attachment main body 40 so that a structure for attaching the cover 50 to the attachment main body 40 are shown. FIG. 9 is a perspective view of the cover 50.

In the description below, the longitudinal direction of the game controller 20 is defined as the front-back direction (the Y1-Y2 direction in the diagram (the Y1 direction corresponds to a forward direction)); the direction orthogonal to the front-back direction, in which the grip 41 of the attachment main body 40 is elongated is defined as the up-down direction (the Z1-Z2 direction in the diagram); and the direction orthogonal to both of the front-back and up-down directions is defined as the left-right direction (the X1-X2 direction in the diagram).

Initially, the game controller 20 will be described. As shown in FIG. 2 or 4, the game controller 20 comprises a light emitting part 21 and a bar-shaped controller main body 22. In this example, the controller main body 22 is formed in a substantial column shape. In detail, the controller main body 22 has a diameter that changes gradually in the longitudinal direction so as to be smaller in the middle part thereof in the longitudinal direction than in the front and rear parts. The foremost part 22a of the controller main body 22 is shaped in a substantial frustum of circular cone, becoming thinner toward the front. That is, the diameter of the foremost part 22a becomes gradually smaller toward the light emitting part 21. Meanwhile, the rear end surface (an end surface opposite from the light emitting part 21) 22b of the controller main body 22 is formed substantially hemispherical.

A plurality of press buttons 31 to 35 are formed on the outer circumferential surface of the controller main body 22 so that a user can operate the buttons 31 to 35 while holding the controller main body 22 with his/her single hand. That is, a user can attach the game controller 20 to the attachment 4 and use those as the controller assembly 10, and the user can use only the game controller 20 without the attachment 4.

In this example, as shown in FIG. 2, the upper side in the front part of the controller main body 22 is provided with a first button 31 elongated in the front-back direction and a plurality of (four in this example) second buttons 32 positioned on the left and right sides of the first button 32. Further, a power button 33 of the game controller 20 is provided at the rear of the first button 31. Still further, side buttons 34 are provided on the left and right sides in the front part of the controller main body 22. These side buttons 34 may function as, e.g., a start button to start a game and/or a select button to select a menu during a game.

As shown in FIG. 4 or 7, an analog button 35 is provided on the opposite side (a lower side in the front part of the controller main body 22) from the first button 31 relative to the central line C along the longitudinal direction of the controller main body 22. The game controller 20 sends, to the game device 2, a signal indicating the press amount of the analog button 35. The analog button 35 in this example is movable diagonally rearward toward the central line C around the fulcrum P formed inside the controller main body 22, as indicated by the arrow D in FIG. 7, and a signal according to a press amount of the analogue button 35 is sent to the game device 2.

As shown in FIG. 2 or 7, the controller main body 22 includes a built-in sensor 39 for detecting a movement and a posture of the game controller 20. For example, the controller main body 22 includes, as the sensor 39, one or more of an accelerator sensor for outputting a signal in accordance with acceleration applied to the game controller 20, a geomagnetic sensor for outputting a signal in accordance with geomagnetism, and a gyro sensor for outputting a signal in accordance with an angular speed. As described above, an output signal from the sensor 39 is sent to the game device 2, so that the game device 2 calculates a movement and a posture (orientation) of the game controller 20, based on the output signal. In this example, the sensor 39 is mounted in the front part of the controller main body 22.

As shown in FIG. 2 or 7, the light emitting part 21 is mounted on the front end surface 22c of the controller main body 22. That is, the light emitting part 21 is positioned further forward than the front end surface 22c of the controller main body 22. The light emitting part 21 in this example is formed substantially spherical with the center thereof positioned on the central line C of the controller main body 22. The diameter R1 of the light emitting part 21 is substantially equal to the diameter R2 of the foremost part of the controller main body 22 (see FIG. 7).

As shown in FIG. 7, the light emitting part 21 is hollow part and is made using light transmitting and light diffusing material (e.g., silicon resin). A light source 23 is held inside the front end of the controller main body 22 so as to emit light toward inside of the light emitting part 21. The light from the light source 23 toward inside of the light emitting part 21 spreads radially through the outer surface of the light emitting part 21. Three LED s (a light emitting diode) corresponding to, e.g., the optical three primary colors are provided as the light source 23, and emit light with an intensity directed by the game device 2. Therefore, the light emitting part 21 glows in various colors.

The light emitting part 21 has a part on the outer surface thereof, which is connected to the front end surface 22c of the controller main body 22. That is, as shown in FIG. 7, the light emitting part 21 has, between itself and the front end surface 22c of the controller main body 22, a coupling portion 21a coupling the light emitting part 21 and the front end surface 22c. The width W of the coupling portion 21a in the direction orthogonal to the longitudinal direction (the front-back direction in this example) of the controller main body 22 is smaller than that of the light emitting part 21 (that is, the width W is smaller than the diameter R1 of the light emitting part 21), and thereby, light from the light emitting part 21 spreads partially diagonally rearward as well. This can ensure better recognition of the light emitting part 21 by the image capturing unit 3.

In the following, the attachment 4 will be described. As shown in FIG. 2 or 3, the attachment main body 40 can be attached to the game controller 20, and the cover 50 can be attached to the attachment main body 40 while covering the controller main body 22.

The attachment main body 40 includes a grip 41 to be held by a user. Further, the attachment main body 40 includes an attached portion 42 formed along the controller main body 22 and attachable to, and detachable from, the controller main body 22. As shown in FIG. 2 or 5, the attached portion 42 is formed elongated along the outer circumferential surface of the controller main body 22 toward the light emitting part 21. Specifically, in this example, the attached portion 42 extends from the upper portion of the grip 41 toward the foremost part 22a of the outer circumferential surface of the controller main body 22. The attached portion 42 has a shape that can cover the lower side of the outer circumferential surface of the controller main body 22 and matches the outer shape of the controller main body 22. In this example, as the controller main body 22 is formed in a substantial column shape, the inner surface of the attached portion 42 is formed in a shape of substantially halved a cylinder, of which cross section presents a substantially arc open upward. This structure allows the attached portion 42 and the controller main body 22 to be assembled together in the up-down direction (that is, the direction orthogonal to the longitudinal direction of the controller main body 22). Further, since the middle part of the controller main body 22 is thinner than the front and rear parts thereof, as described above, the middle part of the inner surface of the attached portion 42 is resultantly positioned slightly higher than the front and rear parts thereof (see FIG. 7). This makes the controller main body 22 hardly move forward relative to the attached portion 42.

As shown in FIG. 5, the attached portion 42 has a rear wall 42g positioned at the rear of the controller main body 22 for covering the rear end surface 22b of the controller main body 22. In this example, as the rear end surface 22b is formed substantially hemispherical, the inner surface of the rear wall 42g is formed curved, forming a part of the hemisphere in accordance with the rear end surface 22b.

A substantially round opening is formed open rearward on the rear wall 42g, and a lid 45 is attached to the opening, as shown in FIGS. 5 and 7. Meanwhile, a connector (not shown) (e.g., a connector for an expansion device, such as a USB) is provided on the rear end surface 22b of the controller main body 22. With the lid 45 removed, a cable or the like can be connected to the connector of the controller main body 22 to charge the game controller 20 while the attachment main body 40 is kept attached to the controller main body 22. In addition, the rear wall 42g has a long slit 42i formed thereon and extending downward from an edge of the opening. Meanwhile, a hole 22g is formed on the rear end surface 22b of the controller main body 22 for threading a strap (not shown) or the like through (see FIG. 4). A strap threaded in the opening 22g can be pulled outside of the rear wall 42g via the slit 42i.

The attached portion 42 has a double structure. In detail, as shown in FIGS. 5, 7, and 8, the attached portion 42 has an inside wall 42L and outside walls 42m, 42n. The inside wall 42L is shaped curved to match the outer shape of the controller main body 22, and forms the inner surface of the attached portion 42. Meanwhile, the outside walls 42m, 42n forms the outer surface of the attached portion 42. This arrangement can improve rigidity of the attached portion 42 while reducing the weight of the attachment main body 40.

In this example, the outer surface of the attachment main body 40 is composed of three resin members each molded integral. Specifically, as shown in FIG. 3, the attachment main body 40 has a rear wall 40R including the outside wall 42n and a grip rear wall 41b. The outside wall 42n forms the outer surface in the rear part of the attached portion 42. The grip rear wall 41b extends downward from the outside wall 42n to form the outer surface in the rear part of the grip 41. In addition, the attachment main body 40 has left and right front walls 40F defining the front part of the attachment main body 40. Each front wall 40F includes a grip front wall 41c and an outside wall 42m. The grip front wall 41c forms an outer surface in the front part of the grip 41. The outside wall 42m extends forward from the upper part of the grip front wall 41c to form the outer surface in the front part of the attached portion 42. The left and right front walls 40F and the rear wall 40R are respectively formed integral using resin, and assembled together to thereby constitute the outer surface of the attachment main body 40. Specifically, the left and right front walls 40F are assembled together in the left-right direction using a screw 61 (see FIG. 7), and the rear wall 40R is assembled to the front walls 40F such that the front edges 40a thereof match the rear edges of the front walls 40F. As shown in FIG. 7 or 8, prongs 40c, 40f are formed on the rear edges of the front walls 40F to be hooked on the edges 40a of the rear wall 40R.

The outside wall 42m of the front wall 40F is aligned to the outside wall 42n of the rear wall 40R in the front-back direction, both forming the outer surface of the attached portion 42. The inside wall 42L is placed inside the outside wall 42m and the outside wall 42n. In this example, as shown in FIG. 7, the inside wall 42L has an annular fixing portion 42z formed on the lower surface thereof and the fixing portion 42z accepts a boss into which a screw 61 is inserted. With the above, the inside wall 42L is fixed to the outside walls 42m, 42n.

The attached portion 42 and the controller main body 22 of the game controller 20A have a concave and a convex to be engaged with each other when the controller main body 22 is mounted on the attached portion 4. In this example, a plurality of holes 22d, 22f are formed open downward on the outer circumferential surface of the controller main body 22, as shown in FIG. 4. Specifically, the plurality of (two in this example) holes 22d are formed on the left and right sides in the front part of the controller main body 22, while the plurality of (two in this example) holes 22f are formed on the left and right sides in the rear part of the controller main body 22. Meanwhile, a plurality of (two in this example) projections (engagement portion) 42a are formed projecting upward on the inner surface (the inside wall 42L in this example) of the attached portion 42, as shown in FIG. 5. Specifically, the projections 42a are formed in the foremost part of the attached portion 42, and their positions correspond to the holes 22d. Therefore, when the controller main body 22 assembled to the attached portion 42 in the up-down direction, the projection 42a is inserted into the hole 22d to thereby regulate forward movement of the controller main body 22 and rotation of the same around the central line C. In this example, no such projection 42a is formed in the rear part of the attached portion 42. This makes it easier for a user to remove the controller 20 from the attached portion 42 by pulling up the front part (e.g., the light emitting part 21) of the game controller 20. However, the projection 42a may be formed in the rear part of the attached portion 42 as well. Such an arrangement can ensure more stable mounting of the game controller 20 on the attached portion 42.

The attached portion 42 additionally has fitting portions 42b for sandwiching the controller main body 22 from left and right sides of the controller main body 22. In this example, as shown in FIG. 5, the fitting portions 42b are formed as prongs on the left and right sides of the attached portion 42, projecting inward of the attached portion 42. Meanwhile, concaves 22e are formed on the right and left sides of the outer circumferential surface of the controller main body 22, as shown in FIG. 2. The concave 22e in this example is a groove extending in the longitudinal direction of the controller main body 22. When the controller main body 22 is mounted on the attached portion 42, the left and right fitting portions 42b are fit in the concaves 22e, to thereby together sandwich the controller main body 22. This makes it unlikely that the controller main body 22 is separated from the attached portion 42 in the up-down direction.

As shown in FIG. 5, the inner surface of the attached portion 42, that is, the inside wall 42L, has, on the left and right sides of the inside wall 42L, plate-like moving portions 42c elongated along the outer circumferential surface of the controller main body 22. Specifically, the moving portion 42c extends upward from the lower edge thereof that is connected to the other part of the inside wall 42L along the outer circumferential surface of the controller main body 22. Accordingly, the left and right moving parts 42c can be slightly elastically deformed, widening outward in the left-right direction. The fitting portion 42b is formed on the upper edge of the moving portion 42c. When the controller main body 22 is being assembled into the attached portion 42 in the up-down direction, the fitting portion 42b hits on the outer circumferential surface of the controller main body 22, and thereby the left and right moving portions 42c are caused to widen outward.

As shown in FIG. 5, a plurality of cushions 43a, 43b are provided on the inner surface of the inside wall 42L. The cushions 43a, 43b are made using, e.g., seat-shaped rubber or resin or damping material such as fiber. Specifically, the cushion 43a is mounted on the bottom in the foremost part of the inside wall 42L. The cushion 43b is mounted on the bottom in the rearmost part of the inside wall 42L. Further, left and right cushions 43c are mounted at the almost middle of the attached portion 42 in the longitudinal direction. This cushion 43c as well is made using, e.g., seat-shaped rubber or resin or damping material such as fiber. The cushion 43c is positioned in a lower part of the moving portion 42c. When the controller main body 22 is mounted on the attached portion 42, the outer circumferential surface of the controller main body 22 abut mainly on the cushions 43a, 43b, 43c, but not on the other parts of the inner surface of the attached portion 42.

The controller assembly 10 has the cover 50, as described above. As shown in FIGS. 2 and 3, the cover 50 is arranged opposite the attached portion 42 in the up-down direction, and covers the upper side of the controller main body 22. Similar to the attached portion 42, the cover 50 is formed elongated along the outer circumferential surface of the controller main body 22 to the foremost part 22a of the outer circumferential surface, covering the controller main body 22. This configuration can prevent the game controller 20 from being separated from the attachment main body 40. In this example, the attached portion 42 and the cover 50 are separately formed to be assembled together in the up-down direction. A structure for attaching the cover 50 to the attached portion 42 will be described later in detail.

Similar to the attached portion 42, the cover 50 has a shape of substantially a halved cylinder. The cover 50 is placed on the attached portion 42 such that the respective left and right ends thereof are placed on respective those of the attached portion 42 so that the attached portion 42 and the cover 50 together constitute a cylindrical enclosure as a whole for accommodating the controller main body 22. The attached portion 42 has the rear wall 42g at the rear of the controller main body 22 that covers the rear end surface 22b, as described above. Meanwhile, as shown in FIG. 9, the cover 50 has a rear wall 50g that covers, together with the rear wall 42g, the rear end surface 22b of the controller main body 22. The rear end surface 22b is formed substantially hemispherical, and the inner surface of the rear wall 42g and the rear wall 50g as well are both formed substantially spherical in accordance with the rear end surface 22b. As a result, the attached portion 42 and the cover 50 together present a bottomed cylindrical shape as a whole.

As shown in FIG. 2 or 3, an opening 50a is formed on the cover 50, through which the buttons 31 to 33 arranged on the upper side of the controller main body 22 are exposed. Further, a lower wall 50d is formed in an area surrounding the opening 50a, the lower wall 50d being concave relative to the foremost part 50b and rear part 50c of the cover 50. The lower wall 50d is positioned lower in height than the buttons 31 to 33, which makes it easier for a user to operate the buttons 31 to 33.

The game controller 20 has the light emitting part 21 at the front end thereof, as described above. When the attachment main body 40 is attached to the game controller 20, as shown in FIG. 3, the light emitting part 21 is positioned beyond the front end 42e of the attached portion 42 in the longitudinal direction of the controller main body 22. In other words, the attached portion 42 is formed such that the front end (that is, the front end of the attachment main body 40) thereof is positioned more rearward than the light emitting part 21. In this example, as shown in FIG. 7, the front end 42e of the attached portion 42 is positioned more rearward than the coupling portion 21a positioned between the light emitting part 21 and the front end surface 22c of the controller main body 22. This leaves the entire light emitting part 21 to be positioned more forward than the front end 43e of the attached portion 42.

Further, as shown in FIG. 3, when the cover 50 is attached to the attached portion 42, the front end 50e of the cover 50 is positioned more rearward than the light emitting part 21. In other words, the light emitting part 21 is positioned outside the cylindrical enclosure constituted by the attached portion 42 and the cover 50.

The front end 42e of the attached portion 42 is formed in an arc shape surrounding the central line C of the game controller 20. In this example, the front end 50e of the cover 50 and the front end 42e of the attached portion 42 together constitute an annular shape as a whole, not covering the front end surface 22c of the controller main body 22. That is, the front end surface 22c of the controller main body 22 is exposed forward inside the front end 50e of the cover 50 and the front end 42e of the attached portion 42. This structure can enlarge the space behind the light emitting part 21, compared to a design with the front end surface 22c covered by the attached portion 42 and the cover 50. And thus, the structure makes it less likely that progress of light from the light emitting part 21 is hindered by the attached portion 42 and the cover 50.

As shown in FIG. 3, the outer circumferential surface of the foremost part 50b of the cover 50 is formed inclined to extend forward and inward. In addition, the outer circumferential surface of the foremost part 42f of the attached portion 42 as well is formed inclined to extend forward and inward. Accordingly, the outer circumferential surface of the cover 50 and that of the attached portion 42 together define, in the foremost parts 50b, 42f, a tapered shape that gradually becomes thinner toward the light emitting part (that is, forward). That is, the diameter of the cylinder constituted by the foremost parts 50b, 42f becomes gradually smaller toward the light emitting part 21. This makes it less likely that the foremost parts 50b, 42f hinder the light from the light emitting part 21 from proceeding. Further, the foremost part 50b of the cover 50 is formed inclined to extend forward and inward. And, the foremost part 42f of the attached portion 42 as well is formed inclined to extend forward and inward. According to this structure, the foremost part 50b and the foremost part 42f can surly prevents the forward movement of the controller main body 22.

The attachment 4 includes the grip 41 to be held by a user, as described above. In this example, as shown in FIG. 2 or 3, the grip 41 extends downward from the rear part of the attached portion 42 so as to present, together with the attached portion 42, a substantially L-shape. That is, when the attached portion 42 is attached to the controller main body 22 of the game controller 20, the grip 41 extends in a bending direction relative to the longitudinal direction (the front-back direction in this description) of the controller main body 22. In other words, the grip 41 extends in a direction of going farther away from the central line C of the controller main body 22 so that the grip 41 and the controller main body 22 are arranged to together present a substantially L-shape.

In this example, as shown in FIG. 7, the rear part of the controller main body 22 is positioned above the grip 41. Moreover, since the attached portion 42 is formed swollen rearward beyond the upper part of the grip 41, the controller main body 22 can be positioned more rearward than it would be with a design without such a swell. This achieves the center of gravity of the controller main body 22 defined in a position closer to the grip 41. Such positioning can reduce a moment to be caused around the grip 41 when a user changes the orientation of the controller assembly 10, which makes it easier for a user to move the controller assembly 10.

The game controller 20 has the built-in sensor 39 arranged inside the controller main body 22 for detecting movement and posture of the game controller 20, as described above. As shown in FIG. 7, when the attachment 4 attached to the game controller 20, the sensor 39 is positioned more forward than the grip 41, in detail, more forward than the front surface of the grip 41. This makes it easier for the sensor 39 to detect a movement that changes the orientation of the controller assembly 10.

In the following, a structure for attaching the cover 50 to the attachment main body 40 will be described. The cover 50 is attached to be placed on the attached portion 42 such that the left and right edges thereof are respectively placed on the left and right upper edges of the attached portion 42. In detail, as shown in FIG. 9, a plurality of (two in this example) engagement portions 51 are formed on the left and right edges of the cover 50, and a hook 51a is formed on each engagement portion 51. In this example, the engagement portion 51 is formed as a plate elongated downward from the respective left and right edge of the cover 50, and the hook 51a is formed on the outer surface of each engagement portion 51. The two engagement portions 51 are positioned apart from each other in the front-back direction. Meanwhile, a plurality of engagement portions 46a are formed on the left and right upper edges of the mount 4 to be hooked at the hooks 51a, as shown in FIG. 8. When the hook 51a is hooked at the engagement portion 46a, the cover 50 is fixed to the attached portion 42. Moreover, the attached portion 42 has sliders 46 on the respective left and right sides thereof. The plurality of (two in this example) engagement portions 46a are formed on each slider 46. In this regard, the slider 46 is a plate-like member and disposed between the inside wall 42L and the outside walls 42m, 42n, which constitute the double structure of the attached portion 42 described above.

Each slider 46 is slidable in the direction along the left and right upper edges of the attached portion 42 (that is, the front-back direction). Specifically, the slider 46 can slide rearward from the position where the engagement portion 46a hits on the hook 51a (hereinafter referred to as an engaged position (the position of the slider 46 shown in FIG. 8)). Therefore, when the hook 51a of the engagement portion 51 hits on the engagement portion 46a, the slider 46 resultantly moves rearward from the engaged position. As shown in FIG. 8, a spring 47 is provided at the rear of the slider 46 for urging the slider 46 toward the engaged position. This makes the slider 46 to be pushed back toward the engaged position by the spring 47 after the hook 51a has gone downward beyond the engagement portion 46a. This causes the hook 51a to be hooked at the engagement portion 46a. In this regard, the slider 46 is guided for movement by the inner surfaces of the outside walls 42m, 42n.

As shown in FIG. 5, edge plates 42q, 42r are provided on the respective left and right upper edges of the attached portion 42. The edge plates 42q, 42r are formed as substantially horizontal plates, and placed perpendicular to the direction in which the cover 50 is attached (the up-down direction). Holes are formed open upward on the edge plate 42q, 42r. In the engaged position, the engagement portions 46a are positioned below the holes formed on the edge plates 42q, 42r. The engagement portion 46a moves rearward from the position of the hole as the slider 46 moves.

In this regard, the edge plates 42q, 42r are formed integral with the respective outside walls 42m, 42n. The rear edge plate 42r formed integral with the outside wall 42n is positioned higher than the front edge plate 42q formed integral with the outside wall 42m. Further, an additional hole 42y is formed on the edge plate 42r. As shown in FIG. 9, a convex 52 is formed on the respective left/right edge of the cover 50 to be inserted in the hole 42y to thereby regulate the position of the cover 50 relative to the attached portion 42.

A part of the slider 46 is exposed outside in the left-right direction through an opening 42p formed on the outside wall 42n. In detail, an operating portion 46b elongated in the front-back direction is formed on the slider 46 to swell slightly outward in the left-right direction in a position inside the opening 42p. The opening 42p is longer than the operating portion 46b in the front-back direction to allow the above described front-back movement of the slider 46. A user can move the operating portions 46b of the left and right sliders 46 rearward while holding the operating portions 46b, to thereby release engagement between the engagement portion 46a and the hook 51a to remove the cover 50 from the attached portion 42.

In this regard, the operating portion 46b is positioned between the two engagement portions 46a provided apart from each other in the front-back direction. In detail, as shown in FIG. 8, the slider 46 has a rod 46c extending forward from the operating portion 46b and positioned below the edge plate 41g, and the front engagement portion 46a is positioned on the side of the front end of the rod 46c. The rear engagement portion 46a is positioned more rearward than the operating portion 46b.

As shown in FIG. 7, the attachment main body 40 has an operating member 49 provided below the inside wall 42L. The operating member 49 has a trigger 49a formed in a rear part thereof, in particular, in a position in front of the upper part of the grip 41. Further, an opening is formed on the front surface of the grip 41 so that the rear part of the trigger 49a is inserted into the opening. The operating member 49 is movable in the front-back direction, so that a user can pull the trigger 49a backward. A spring 48 is provided above the operating member 49 so that the operating member 49 is urged forward by the spring 48.

As shown in FIG. 7, the controller main body 22 is placed such that the analog button 35 faces the bottom of the attached portion 42 in the up-down direction. When the controller main body 22 is mounted on the attached portion 42, the analog button 35, formed in the front part of the controller main body 22, is resultantly positioned apart forward from the trigger 49a. The trigger 49a is provided with an arm 49b extending forward from the trigger 49a, and movement of the trigger 49a is transmitted to the analog button 35 through the arm 49b. In detail, the arm 49b extends forward from the upper part of the trigger 49a and has a wall-shaped projection 49c on the front end thereof. The projection 49c projects upward through a hole 42u formed on the inside wall 42L (see FIG. 5) to be positioned in front of the analog button 35. Therefore, when the trigger 49a moves rearward, the rear surface (hereinafter referred to an abutment surface) 49d of the projection 49c hits on, and thereby presses, the analog button 35.

As shown in FIG. 7, the tip end of the analog button 35 projects downward beyond the outer circumferential surface of the controller main body 22 (that is, projects toward outside of the controller main body 22 in the radial direction), thus being inserted in the hole 42u and abutting on a lower part of the abutment surface 49d. The analog button 35 is adapted to diagonally rearward and upward movement around the fulcrum P, as described above. Therefore, when the analog button 35 is pressed by the abutment surface 49d and thereby moves diagonally rearward and upward, the tip end of the analog button 35 moves up while sliding on the abutment surface 49d.

Further, since the analog button 35 moves diagonally rearward and upward around the fulcrum P, the movement amount of the analog button 35 in diagonally upward direction relative to the movement amount of the operating member 49 in rearward direction is changing to be gradually larger. In this example, since the abutment surface 49d is formed curved so that such a change in the movement amount of the analog button 35 relative to that of the operating member 49 become reduced. Specifically, the abutment surface 49d is curved such that the distance from the analog button 35 to the abutment surface 49d become larger toward the above. That is, the abutment surface 49d is formed inclined forward and curved while swelling diagonally rearward and upward.

The front surface of the analog button 35 is formed inclined so as to extend diagonally upward and forward. Meanwhile, the abutment surface 49d is formed inclined forward, as described above. Therefore, the analog button 35 buts on the abutment surface 49d only on the tip end thereof but not on other parts thereof as the analog button 35 moves.

The side buttons 34 are provided on the respective left and right sides on the outer circumferential surface of the game controller 20, as described above. Moreover, the respective left and right upper edges of the attached portion 42 has through-holes formed thereon which penetrates the attached portion 42 in the left-right direction. An operating member 62 is arranged inside the through-hole and movable in the left-right directions relative to the attached portion 42. The position of the operating member 62 corresponds to the position of the side button 34, so that a user can operate the side button 34 by pressing the operating member 62.

As described above, the controller assembly 10 comprises a game controller 20 and an attachment 4. The game controller 20 has a bar-shaped controller main body 22 and a light emitting part 21 provided at the front end 22c of the controller main body 22. The attachment 4 has the attached portion 42 formed along the outer circumferential surface of the controller main body 22 and attachable to, and detachable from, the controller main body 22. Further, the attachment 4 includes a grip 41 for being held by a user. The attached portion 42 is formed such that the front end 42e thereof is positioned more rearward than the light emitting part 21 when the attached portion 42 is attached to the game controller 20. This structure can prevent deterioration in recognition of the light emitting part 21 by the image capturing unit 3.

The grip 41 is formed to extend in a bending direction relative to the longitudinal direction of the game controller 20 when the attached portion 42 is attached to the game controller 20. According to this arrangement, the controller assembly 10 can have a gun shape. Further, this structure makes it possible for a user to readily direct the light emitting part 21 forward while holding the grip 41.

The attached portion 42 is formed to extend forward along the outer circumferential surface of the game controller 20 when the attached portion 42 is attached to the game controller 20. This structure ensures stable attachment of the attached portion 42 to the game controller 20.

The light emitting part 21 of the game controller 20 is formed substantially spherical, and the front end 42e of the attached portion 42 is formed in an arc shape that surrounds the central line of the game controller 20. This structure makes it unlikely that the light from the light emitting part 21 is blocked by the attached portion 42.

The attachment 4 has a cover 50 arranged opposite the attached portion 42 and covering the game controller 20. The attached portion 42 and the cover 50 are formed to together have a cylindrical shape capable of accommodating the game controller 20. This structure ensures stable holding of the game controller 20 by the attached portion 42 and the cover 50. Alternately, the cover 50 may be formed either integral with or separately from the attached portion 42.

The foremost part 50b of the cover 50 and the foremost part 42f of the attached portion 42 are formed to have a cylindrical shape becoming thinner toward the front. This structure makes it unlikely that the light from the light emitting part 21 toward diagonally rearward is blocked by the attached portion 42 and the cover 50.

The cover 50 is formed separately from the attached portion 42 and so as to be attachable to, and detachable from, the attached portion. This structure makes it easier to attach the attached portion 42 to the game controller 20 compared to a design in which the cover 50 and the attached portion 42 are formed integral with each other to together have a cylindrical shape so that the game controller 20 is inserted into the cylinder from either the front or rear side thereof. In addition, when the light emitting part 21 is designed larger, the attached portion 42 can be attached to the game controller 20.

The game controller 20 includes a bar-shaped controller main body 22, and a coupling portion 21a positioned between and coupling the controller main body 22 and the light emitting part 21. The attached portion 42 is formed such that the front end 42e of the attached portion 42 is positioned more rearward than the coupling portion 21a when the attached portion 42 is attached to the controller main body 22. With this structure, the entire light emitting part 21 is positioned more forward than the front end 42e of the attached portion 42, which further improves recognition of the light emitting part 21 by the image capturing unit 3.

The game controller 20 includes a bar-shaped main body 22. The cover 50 and the attached portion 42 are formed so as to extend along the outer circumferential surface of the controller main body 22 to the foremost part 22a of the outer circumferential surface. This structure enables stable holding of the controller main body 22 by the attached portion 42 and the cover 50.

The attached portion 42 has a projection 42a formed thereon to be inserted in the concave 22d formed on the outer circumferential surface of the game controller 20. This structure can regulate relative movement of the game controller 20 relative to the attachment 4.

The game controller 20 incorporates a built-in sensor 39 for detecting movement of the game controller 20. The grip 41 is positioned more rearward than the sensor 39 when the attached portion 42 is attached to the controller main body 22. This structure facilitates detection of movement that changes the orientation of the game controller assembly 10.

Note that the present invention is not limited to the above described controller assembly 10, and can be modified in various manners.

For example, although the cover 50 and the attached portion 42 are separately formed in the above description, the cover 50 and the attached portion 42 may be formed integral with each other so as to together constitute a cylindrical shape as a whole. In this case, the controller main body 22 is inserted into the cylindrical enclosure from the front side thereof.

Further, although the rear part of the controller main body 22 is positioned above the grip 41 in the above description, the controller main body 22 may be positioned apart forward from the grip 41.

Further, although the controller main body 22 is formed in a substantial column shape, and the attached portion 42 and the cover 50 are formed to have a substantial cylindrical shape as a whole in the above description, the controller main body 22 may be formed in a substantially rectangular solid shape, and the attached portion 42 and the cover 50 may be formed in a rectangular barrel shape as a whole.

Further, although the controller assembly 10 has the cover 50 attached thereto, the controller assembly 10 may not have the cover 50.

What is claimed is:

1. An attachment for a game controller, the game controller including: (i) a bar-shaped controller main body having an outer circumferential surface of varying diameter along a longitudinal direction thereof, where the diameter gradually reduces to a first diameter at a foremost part at a front end surface of the controller main body; (ii) a coupling portion located on the front end surface of the controller main body and having a second diameter that is smaller than the first diameter, and (iii) a light emitting part coupled to the front end surface via the coupling portion and being substantially in the form of a sphere having a third diameter larger than the second diameter, the attachment comprising:
    a grip for being held by a user; and
    an attached portion attachable to, and detachable from, the outer circumferential surface of the controller main body, the attached portion including a front end at a most forward portion thereof, and an inner surface having a contour in complimentary conformity with the outer circumferential surface of the controller main body such that a fourth diameter of the inner surface also reduces substantially to the first diameter of the foremost part at the front end surface of the controller main body,
    wherein the attached portion is formed such that the front end surface of the controller main body is exposed and positioned forward of the front end of the attached portion, and the front end of the attached portion is positioned more rearward than the coupling part and the light emitting part when the attached portion is attached to the controller main body.

2. The attachment according to claim 1, wherein the grip is formed to extend in a bending direction relative to the longitudinal direction of the controller main body when the attached portion is attached to the controller main body.

3. The attachment according to claim 2, wherein:
    the outer circumferential surface of the controller main body includes a middle portion having a diameter smaller than both the first diameter at the foremost part and a diameter at an opposing rearmost part of the controller main body;
    the inner surface of the attached portion includes a middle portion having a contour in complimentary conformity with the middle portion of the outer circumferential surface of the controller main body, such that the middle portion of the inner surface swells inwardly to substantially meet the diameter of the middle portion of the controller main body; and
    the attachment portion includes an operating member located below the inner surface thereof, the operating member being biased forward by a spring.

4. The attachment according to claim 1, wherein the attached portion is formed to extend forward along the outer circumferential surface of the game controller when the attached portion is attached to the controller main body.

5. The attachment according to claim 4, wherein
    the light emitting part of the game controller is substantially spherical, and
    the front end of the attached portion is formed in an arc shape that surrounds a central line along the longitudinal direction of the controller main body.

6. The attachment according to claim 4, further comprising:
    a cover arranged opposite the attached portion, for covering the controller main body,
    wherein the attached portion and the cover are formed to have a cylindrical shape capable of accommodating the controller main body.

7. The attachment according to claim 6, wherein a front part of the cover and a front part of the attached portion are formed to have a cylindrical shape having a decreasing diameter toward the front.

8. The attachment according to claim 6, wherein the cover is formed separately from the attached portion so as to be attachable to, and detachable from, the attached portion.

9. The attachment according to claim 6, wherein:
    the outer circumferential surface of the controller main body includes a middle portion having a diameter smaller than both the first diameter at the foremost part and a diameter at an opposing rearmost part of the controller main body;
    the inner surface of the attached portion includes a middle portion having a contour in complimentary conformity with the middle portion of the outer circumferential surface of the controller main body, such that the middle portion of the inner surface swells inwardly to substantially meet the diameter of the middle portion of the controller main body; and
    the attachment portion includes sliders disposed at the middle portion thereof, each slider having an engagement portion for securing the cover to the attached portion.

10. The attachment according to claim 1, wherein the attached portion has a projection formed thereon to be inserted in a concavity formed on the outer circumferential surface of the controller main body.

11. The attachment according to claim 1, wherein:
    the game controller incorporates a built-in sensor for detecting movement of the game controller, and
    the grip is formed to be positioned more rearward than the sensor when the attached portion is attached to the controller main body.

12. A controller assembly, comprising:
    a game controller, the game controller including: (i) a bar-shaped controller main body having an outer circumferential surface of varying diameter along a longitudinal direction thereof, where the diameter gradually reduces to a first diameter at a foremost part at a front end surface of the controller main body; (ii) a coupling portion located on the front end surface of the controller main body and having a second diameter that is smaller than the first diameter, and (iii) a light emitting part coupled to the front end surface via the coupling portion and being substantially in the form of a sphere having a third diameter larger than the second diameter; and
    an attachment for the game controller, wherein the attachment includes:
    a grip for being held by a user, and an attached portion attachable to, and detachable from, the outer circumferential surface of the controller main body, the attached portion including a front end at a most forward portion thereof, and an inner surface having a contour in complimentary conformity with the outer circumferential surface of the controller main body such that a fourth diameter of the inner surface also reduces substantially to the first diameter of the foremost part at the front end surface of the controller main body, wherein the attached portion is formed such that the front end surface of the controller main body is exposed and positioned forward of the front end of the attached portion, and the front end of the attached portion is positioned more rearward than the coupling part and the light emitting part when the attached portion is attached to the controller main body.

* * * * *